United States Patent [19]
Crosby et al.

[11] Patent Number: 5,200,749
[45] Date of Patent: Apr. 6, 1993

[54] FORMAT CONVERTER ARCHITECTURE

[75] Inventors: Philip S. Crosby, Portland; Ajay K. Luthra, Beaverton, both of Oreg.

[73] Assignee: Tektronix, Inc., Wilsonville, Oreg.

[21] Appl. No.: 706,462

[22] Filed: May 28, 1991

[51] Int. Cl.$^5$ ............................................. H04N 7/01
[52] U.S. Cl. ...................................... 341/87; 358/140
[58] Field of Search .................... 340/50, 51, 87, 99; 358/11, 140

[56] References Cited

U.S. PATENT DOCUMENTS

| | | | |
|---|---|---|---|
| 4,306,249 | 12/1981 | Croll | 358/133 |
| 4,468,708 | 8/1984 | Coleman, Jr. | 358/133 |
| 4,533,958 | 8/1985 | Herget | 341/87 |
| 4,884,138 | 11/1989 | Storey | 358/133 |
| 5,001,562 | 3/1991 | Tabata et al. | 358/140 |
| 5,023,717 | 6/1991 | Lamnabhi et al. | 358/140 |
| 5,031,040 | 7/1991 | Maruyama | 358/140 |

*Primary Examiner*—Marc Hoff
*Attorney, Agent, or Firm*—Francis I. Gray

[57] ABSTRACT

A format converter for converting an input signal having a specified format to a digital signal of a pre-existing format, and for converting the digital signal back to the input signal automatically, loads an active data portion of the input signal into an input first-in/first-out (FIFO) buffer at a first data rate and reads the active data portion together with dummy filler samples from the FIFO at a second data rate as the digital signal. The number, location and/or values of the filler samples identify the specified format. In reverse the filler samples are stripped from the digital signal and the resulting active samples are loaded into an output FIFO at the second data rate. The stripped filler samples are used to determine the specified format of the original source of the data signal, and the active samples are read from the output FIFO at the first data rate in the specified format to reproduce the input signal.

16 Claims, 9 Drawing Sheets

FORMAT CONVERTER ARCHITECTURE

BACKGROUND OF THE INVENTION

The present invention relates to conversion of digital data between different formats, and more particularly to a format converter architecture for converting an incoming analog signal having an orthogonal structure, such as television video from different video sources having different television formats, to a pre-existing digital format for storage on a digital video tape recorder (DVTR) or for other processing by equipment built for use with the pre-existing digital format, and also for automatically converting the digital data in the pre-existing digital format back to the format of the original incoming analog signal.

As is well known there are many different kinds of video signal formats proposed or in general use throughout the world in both graphics and television equipment. Generally signal processing and recording equipment must be designed for a specific signal format. The cost and effort associated with the design of this equipment is considerable, inhibiting the development of newer and perhaps more appropriate signal formats for video image signals.

Currently there is a discussion in the television community as to what video signal format should be adopted by the United States for high definition television (HDTV). The formats being considered include a 525/59.94/1:1 format, a 1050/59.94/2:1 format, a (787+788)/59.94/1:1 format, and a 1125/59.94/2:1 format. There presently exists equipment that is compatible with the 1125 format, such as a digital video tape recorder (DVTR) manufactured by Sony Corporation of Tokyo, Japan. To provide a comparison between these various formats it is desirable to be able to record the video from sources representing each of the proposed video formats onto a single video tape recorder, and then to be able to play back the signals from the video tape recorder in their original formats.

One architecture for a format converter design has been proposed by the Advanced Television Test Center (ATTC) located in Alexandria, Va., and is disclosed in U.S. patent application Ser. No. 07/409,190 filed Sep. 7, 1989 by Charles W. Rhodes entitled "Multiple HDTV Format Digital Signal Converter." This architecture converts input video signals having one video format into the video format of a specific DVTR, such as the Sony recorder referred to above. The input video signal is digitized, using the horizontal and vertical drive synchronizing signals derived from the input signal, and stored in a buffer memory at the input signal sample rate. The stored digitized signal is then read out of the memory at the rate of operation of the DVTR. During playback the data from the DVTR is stored in the memory at the DVTR rate and read out to a digital-to-analog converter at the original sample rate. A pair of dummy samples is inserted in each line of the input signal data so that the input video lines provide a repeating pattern every seven or fourteen lines. This repetitive pattern is provided so that memory size may be minimized. The dummy samples may contain information such as parity bits, synchronization bits, memory row identifier bits, a frame start identifier bit, or the like. Unfortunately the Rhodes' format converter does not take into consideration the fact that the number of active video lines in each of the two fields in the 1125/59.94/2:1 format used by the Sony DVTR are not equal. Also knowledge by the operator of the original format is necessary when converting from the DVTR format.

What is desired is a format converter architecture that provides a means of using pre-existing digital processing and record/playback equipment in conjunction with signal formats for which the equipment was not specifically designed in order to facilitate the introduction and comparative analysis of new signal formats, including encoding an input signal from a signal source into the digital format of the pre-existing video equipment and automatically decoding the digital signal from the pre-existing video equipment back into the original format of the input signal.

SUMMARY OF THE INVENTION

Accordingly the present invention provides a format converter architecture that samples and digitizes an incoming analog signal representing a two-dimensional image in such a way as to produce a number of samples per field that is somewhat less than the number of samples per field that occur in a pre-existing digital format, where one field represents one complete two-dimensional representation. The digitized samples are written into an input first-in/first-out (FIFO) buffer. In accordance with the pre-existing digital format the samples are read from the input FIFO buffer together with filler samples to form a sample data stream compatible with the pre-existing digital format. Formatting samples, or identification sequences, are included in the filler samples to indicate certain timing data, such as the beginning and end of horizontal and vertical blanking and the field number for an interlaced digital format, as required by the pre-existing digital format. The remaining filler samples are coded with a value that cannot be produced by a real incoming signal, and are used to identify the format of the incoming analog signal. The filler samples are processed by equipment for the pre-existing digital format as if they were ordinary signal samples, and the sample data stream may be recorded, switched or digitally transmitted by such pre-existing equipment, as is appropriate.

Upon receipt of the sample data stream from the pre-existing equipment, the filler samples are automatically recognized and removed from the sample data stream. The sample data stream, containing only real data, is then written into a output FIFO buffer. The data stream is then read from the output FIFO buffer according to the original incoming signal format, as determined from the filler samples, and converted into an analog signal. Suitable synchronization signals are generated to provide a suitable timing reference for subsequent processing and/or display of the outgoing analog signal.

The objects, advantages and other novel features of the present invention are apparent from the following detailed description when read in conjunction with the appended claims and attached drawing.

DESCRIPTION OF THE PREFERRED EMBODIMENT

In order to clearly describe the present invention an embodiment for converting high definition television (HDTV) signals of differing formats to a pre-existing HDTV format, and back again, is presented. Specifically the 1125/59.94/2:1 HDTV standard adopted by the Japanese television industry is used as an example of the pre-existing format and the 525/59.94/1:1, (787+788)/59.94/1:1 and 1050/59.94/2:1 HDTV formats currently being considered in the United States of America are used as illustrations of differing formats. Generally orthogonal sampling is preferred, and such is obtained when there is a one-to-one correspondence between the sample number modulo N1, the number of active samples per line, and the corresponding X coordinate of that sample in an image represented by the signal. For example in the pre-existing format of the present example there are 1920 active samples per line and 280 samples covering the horizontal blanking interval for a total of 2200 samples per line. With a field frequency of 1000/1001*60 Hz (59.94 Hz) and 1125/2 lines per field, the line frequency is approximately 33.72 kHz (Fh1) and the sampling frequency is approximately 74.2 MHz (Fs1). For this example the field frequency for the proposed formats happens to be the same, but the line frequencies differ. The approximate line frequencies for the three proposed cases are:

1. 525/59.94/1:1—31.5 kHz (Fh2)
2. ((787+788)/2)/59.94/1:1—47.2 kHz (Fh3)
3. (1050/2)/59.94/2:1—31.5 kHz (Fh4)

Factoring the above three line frequencies with respect to Fs1 produces the following three ratios:

$R2=(11*5*5*5*3*2*2)/7$
$R3=(11*5*5*5*2*2*2)/7$
$R4=(11*5*5*5*3*2*2)/7$

If the above formats are to be applied in an orthogonal manner, the respective sampling frequencies, Fs2–Fs4, must differ from Fs1. For convenience these sampling frequencies should be related to Fs1 by an integer ratio, and such ratio should be nearly unity since each format spends similar fractions of signal transmission time sending non-video content, i.e., synchronization and blanking, that can be easily regenerated. Based on the above ratios the fraction 56/55 is a likely candidate for all of the proposed formats, so that the resulting sampling frequencies, Fs2–Fs4, are each approximately 75.5 MHz. The number of samples per line for each of the proposed formats then becomes:

N2=2400
N3=1600
N4=2400

There are two fundamental criteria that need to be applied. First the number of active samples per field in the pre-existing format must exceed or equal the number of active samples in the proposed format. Second to minimize the size of the FIFO buffers the time interval from the first to the last outgoing sample must be nearly equal to the time interval from the first to the last incoming sample.

Generally the formats to be processed have an identical number of active lines in each field, whether or not the standards use interlaced (2:1) scanning. However the pre-existing format selected uses interlaced scanning but has a different number of active scan lines per field. To accomplish conversion in a general sense, then, four parameters are defined:

1R1=number of filler samples in first line of field one;
IR2=number of filler samples in last line of field one;
2R1=number of filler samples in first line of field two; and
2R2=number of filler samples in last line of field two.

The parameters for the selected pre-existing format are:
Number of Samples per Line=2200
Active Samples per Line=1920
Active Lines in Field One=517
Active Lines in Field Two=518.

The extra available samples in field two are of no use unless the FIFO buffers are inordinately large, so that one line in field two is disregarded and
$2R1+2R2 \geq 1920$.

This provides 992,640 (517*1920) available active samples per field, establishing the first criterion.

The time interval from the first sample to the last sample in the pre-existing format is approximately 15.33 mSec ((516*2200+1920)/Fs1). The number of lines in the first and third proposed formats that nearly meets the second criterion is 482.4 (15.33*31.7). Rounding this number up to 483 and subtracting a rough estimate of 5 uSec for the last blanking time results in a time interval of approximately 15.344 mSec, or a difference of about 14 uSec. For the second proposed format the number of lines equals 723.6, or rounded up to 724, and the time interval is approximately 15.333 mSec, a difference of about 3 uSec.

The first criterion defines the maximum number of active samples per line that are allowed in the proposed format. Thus the maximum number of samples per line in the first and third proposed formats is int(992640/483)=2055r75, or 1371r36 for the second proposed format, i.e., 2055 samples per line with a remainder of 75 samples per field. However the component format that is used in the present implementation samples the luminance component at the sampling frequency, Fs, but samples the two chrominance components in a multiplexed fashion, i.e., at one-half Fs. Therefore an is desired. The following are lists of probabilities for the three proposed formats:

| Pre-existing Format | | | |
|---|---|---|---|
| Samples/Field = 992640 | | Lines/Field = 517 | |
| Samples/Line | Total Fill | Fill/Line | Fill/Field |
| Proposed Formats One and Three Lines/Field = 483 | | | |
| 2054 | 558 | 0 | 558 |
| 2052 | 1524 | 2 | 490 |
| 2050 | 2490 | 4 | 422 |
| 2048 | 3456 | 6 | 354 |
| 2046 | 4422 | 8 | 286 |
| 2044 | 5388 | 10 | 218 |
| 2042 | 6354 | 12 | 150 |
| 2040 | 7320 | 14 | 82 |
| 2038 | 8286 | 16 | .14 |
| 2036 | 9252 | 16 | 980 |
| 2034 | 10218 | 18 | 912 |

| | -continued | | |
|---|---|---|---|
| | Pre-existing Format | | |
| Samples/Field = 992640 | | Lines/Field = 517 | |
| Samples/Line | Total Fill | Fill/Line | Fill/Field |
| | Proposed Format Two Lines/Field = 724 | | |
| 1370 | 760 | 0 | 760 |
| 1368 | 2208 | 4 | 140 |
| 1366 | 3656 | 6 | 554 |

From the second criterion for proposed formats one and three the total time difference from the first to last sample is about 14 uSec, or about 1000 samples. Since the number of "remainder" samples should be minimized, and a larger number of remainder samples at the beginning or end of the pre-existing format field necessitates a larger FIFO buffer, the number of samples per line selected for the proposed formats one and three is 2040. This selection requires the transmission of 82 remainder samples, to be divided between the beginning and the end of each field, such as forty in the first line and forty-two in the last line of each field of the pre-existing digital format, or vice versa. For the third proposed format the difference is about 3 uSec, or about 350 samples, and the number of samples per line of 1368 is selected with the corresponding 140 remainder samples per field, divided evenly between the first and last lines. With these parameters established the conversion between the proposed formats and the pre-existing format, and back again, may be achieved as shown in the present embodiment.

Figure 1:
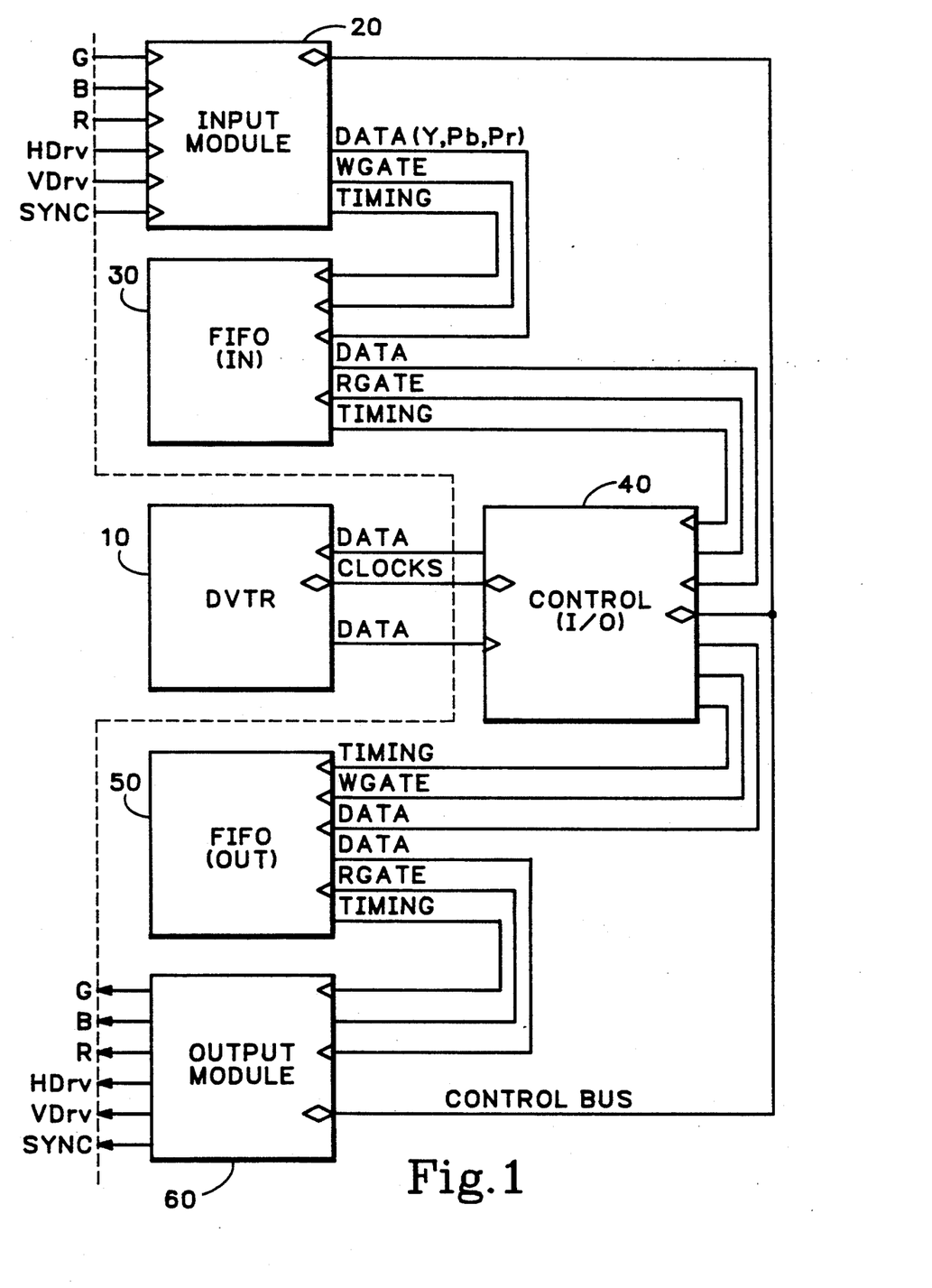
FIG. 1 is a basic block diagram of a format converter according to the present invention.

As shown in FIG. 1 an analog input module 20 receives incoming video signal from a source, such as GBR signals from a camera, etc., and converts them to digital component video Y,Pb,Pr using the sample frequency Fs and the horizontal and vertical drive signals derived from the incoming signal. The active video samples from the digital component signal are written into an input FIFO buffer 30. An operator indicates to a controller 40 the format of the incoming video signal. The controller 40, based upon the parameters contained in memory as derived above, provides timing to the input FIFO buffer 30. The input FIFO buffer 30 receives from the controller 40 a read clock at the pre-existing format sample frequency, Fs1, a read gate signal and a dummy gate signal. In response to these timing signals the input FIFO buffer 30 provides a sample data stream containing both active video samples and filler samples, the filler samples being provided in response to the dummy gate signal and the active video samples being provided in response to the read gate signal. The sample data stream is output to equipment of the pre-existing digital format, such as a DVTR 10, via an input/output section of the controller 40 in the pre-existing digital format.

The filler samples are identifiable from the active video samples because they have "impossible" values, i.e., the luminance and chrominance values cannot be produced by non-negative values of green, blue or red inputs. For the present example the codes chosen to represent a filler sample are 01 for Y, Pb and Pr. Luminance is coded with black at 16 decimal (10 hexadecimal) and white at 219 decimal, while the chrominance component values are in offset binary with zero represented by a code of 128 decimal (80 hexadecimal). Therefore, the filler code of 01 represents slightly negative luminance, together with a large negative value for the chrominance components. This is not a realizable color as it would require large negative values of red and blue, which do not occur in "normal" active video. Information concerning the encoded format may be sent by altering the code used to represent the filler sample, by altering the pattern of filler samples in a predetermined manner, or by counting the number of filler samples in a specified line or number of lines, either pre-existing format lines or proposed format lines. The present example uses as a free parameter the number of remainder samples in the first line of field one of the pre-existing format. This implementation assures that different instances of proposed formats having the same overall filler count may be differentiated.

The sample data stream from pre-existing equipment 10 is input via the input/output section to the controller 40 where the filler samples are stripped from the sample data stream, leaving only the active video samples. The active video samples are written to an output FIFO 50. Based upon the identification of the original format of the sample data stream as determined automatically from the filler samples, the active video samples are read from the output FIFO 50 into an output analog module 60 that regenerates the horizontal and vertical blanking intervals, as well as synchronization pulses, to provide an outgoing video signal in the same format as the original incoming video signal. In this embodiment the total capacity of the FIFO buffers 30, 50 is slightly greater than one line of the pre-existing digital format.

Figure 2A:
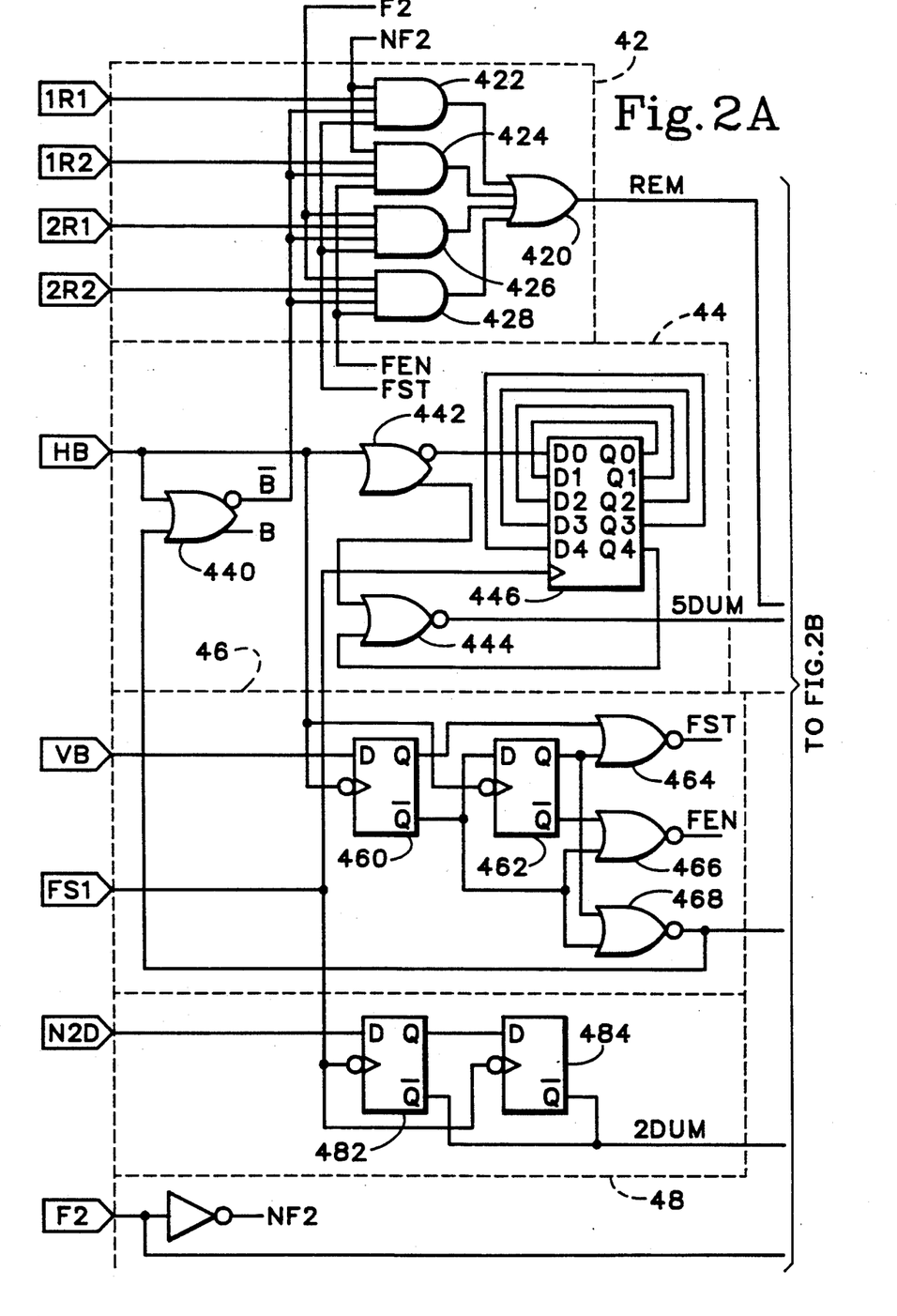
FIGS. 2A and 2B together are a simplified schematic diagram for generating appropriate timing signals for a format converter according to the present invention.
Figure 2B:
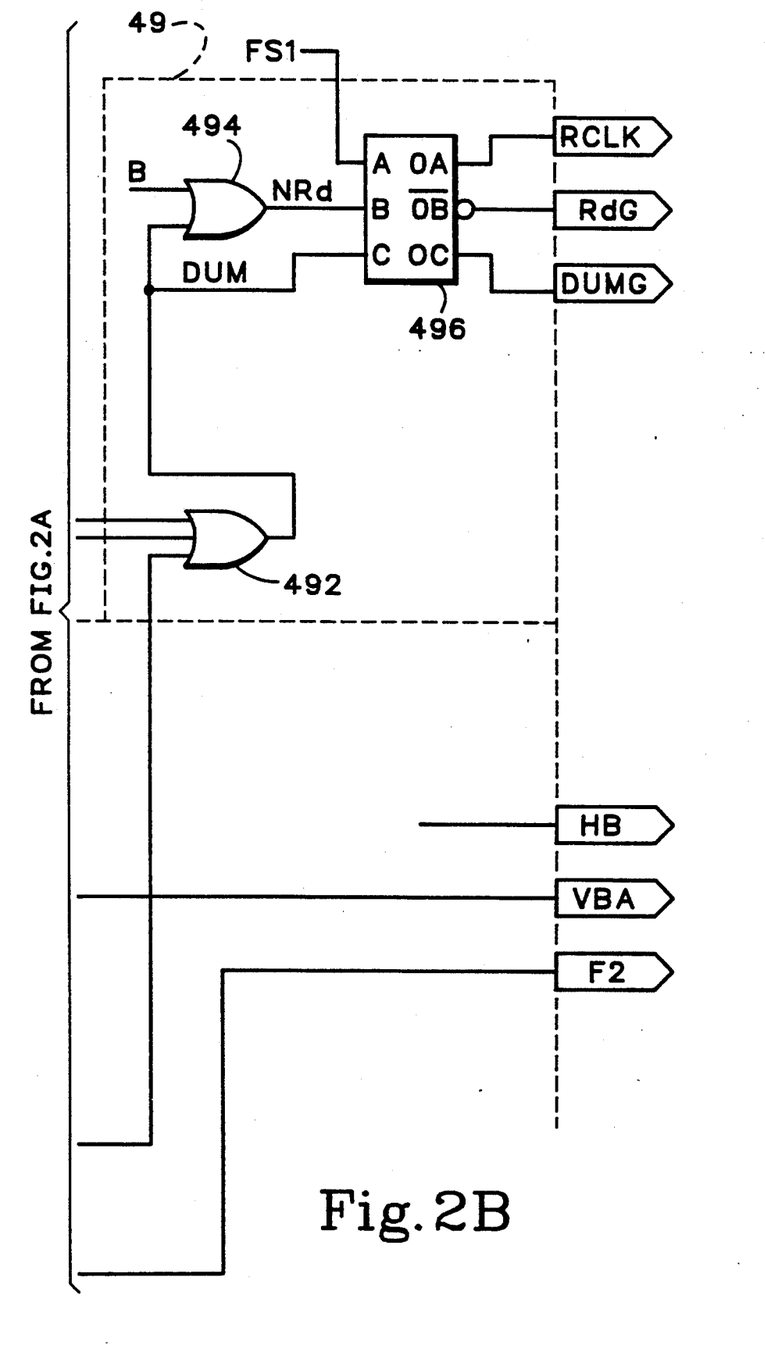

For reading data from the incoming video signal into the input FIFO 30, the controller 40 has a decoder section as shown in FIGS. 2A and 2B that generates the timing signals, such as read and dummy gate signals, for the input FIFO. The decoder section has a remainder logic section 42, an identification dummy logic section 44, a first line/last line logic section 46, a dummy pair logic section 48, and an output section 49. Input to the decoder section are various control commands from a state machine (shown in FIGS. 5A and 5B and discussed below) of the controller 40. These control commands are dependent upon by the indicated incoming video format and include the 1R1, 1R2, 2R1 and 2R2 signals for the remainder dummy fill samples, horizontal and vertical blanking signals, HB, VB, the pre-existing format clock signal, Fs1, a not-dummy pair signal, N2D, and a field two signal, F2, which is inverted to also provide a not-field two signal, NF2. Output from the output logic section 49 are the necessary timing signals for the input FIFO 30, including the read clock, RClk, the read gate signal, RdG, the dummy gate signal, DumG, the horizontal and vertical blanking signals, HB, VBA, and the field two signal, F2.

The first line/last line logic section 46 has a pair of D-type flip-flops 460, 462 that are clocked on the negative edge of the horizontal blanking signal, HB, i.e., at the end of the horizontal blanking interval of the incoming signal. Input to the first flip-flop 460 is the vertical blanking signal, VB, and input to the second flip-flop 462 is the not-Q output of the first flip-flop. The Q outputs of both flip-flops 460, 462 are input to a first NOR gate 464 to produce the start of the first line in a field signal, FSt, and the not-Q outputs of both flip-flops are input to a second NOR gate 466 to produce the start of the last line in a field signal, FEn. The not-Q output of the first flip-flop 460 and the Q output of the second flip-flop 462 are input to a third NOR gate 468 to produce the output actual vertical blanking signal, VBA.

In operation the VB signal starts at the beginning of the horizontal blanking interval of the last line of the field and lasts until the end of the actual vertical blanking interval. The HB signal occurs at the line rate of the incoming video signal to indicate the horizontal blanking interval for each incoming video line. When VB goes positive, on the trailing edge of HB the Q output of the first flip-flop 460 goes high while the not-Q output goes low. With the not-Q outputs of both flip-flops 460, 462 low, the second NOR gate 466 produces a high for the FEn signal, which is the start of the last line of active video in the field. At the next HB trailing edge the not-Q output of the first flip-flop 460 causes the not-Q output of the second flip-flop 462 to go high, producing a low at the output of the second NOR gate 466 so that FEn is high only during the last line of the field. At the end of the vertical blanking interval VB goes low and, when HB also goes low at the end of the horizontal blanking interval prior to the first line of active video in the field, the Q output of the first flip-flop 460 goes low while the not-Q output goes high. With the not-Q outputs of both flip-flops 460, 462 high, the output of the first NOR gate 464 also goes high for the FSt signal. At the next HB trailing edge the Q output of the second flip-flop 462 goes high, producing a low at the output of the first NOR gate 464 so that FSt is high only during the first line of the field. After the last line of the field, when the not-Q output of the first flip-flop 460 is low and the Q output of the second flip-flop 462 goes low, the actual vertical blanking signal, VBA, goes high, i.e., at the end of the last line, and stays high until the not-Q output of the first flip-flop goes low at the end of the VB signal just prior to the first video line.

The actual vertical blanking signal, VBA, and the horizontal blanking signal, HB, are combined in gate 440 to produce a composite blanking signal, B, and its inverse, not-B. The not-B signal together with the FSt, FEn, F2 and NF2 signals are input to the remainder logic section 42. Also input to the remainder logic section 42 are the remainder fill signals, 1R1, 1R2, 2R1, 2R2, from the state machine. A first AND gate 422 produces a high output during the active portion of line one of the first field when the 1R1 signal is present. Likewise a second AND gate 424 produces a high output during the active portion of the last line of field one when the 1R2 signal is present; a third AND gate 426 produces a high output during the active portion of line one of the field two when the 2R1 signal is present; and a fourth AND gate 428 produces a high output during the active portion of the last line of field two when the 2R2 is present. The outputs of the AND gates 422, 424, 426, 428 are combined by an OR gate 420 to produce a remainder fill signal, Rem.

The HB signal also is input to a gate 442 to produce a differential output signal, with the HB output being applied to a NOR gate 444 and the not-HB output being applied to the D0 input of a delay latch 446. The Q0 output of the delay latch 446 is input to the D1 input, the Q1 output to the D2 input, the Q2 output to the D3 input, the Q3 output to the D4 input, and the Q4 output to the NOR gate 444. The delay latch 446 is clocked by the pre-existing format clock, Fs1, so that the output at Q4 is delayed five samples from the input at D0. Prior to the HB signal the output of the NOR gate 444 is low since the not-HB input from the delay latch 446 is high. When HB goes high, after five sample intervals not-HB from the delay latch goes low, but the output of the NOR gate 444 remains low since the HB input is now high. When HB then goes low at the end of the horizontal blanking interval, the output of the NOR gate 444 goes high and a high not-HB signal is applied to the input D0 of the delay latch 446. At the end of five sample intervals the high not-HB is output from the delay latch 446, and the output of the NOR gate 444 goes low again, producing a gate signal, 5Dum, five samples in duration immediately following the end of the horizontal blanking interval.

Figure 6A:
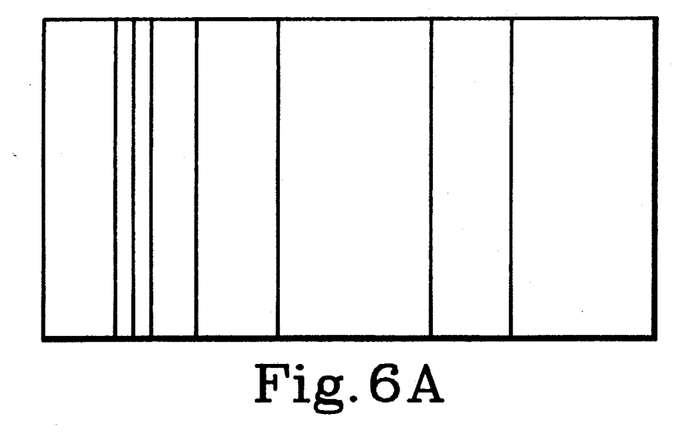
FIGS. 6A–6D are illustrations of monitor displays of different formats after conversion to the pre-existing format according to the present invention.
Figure 6B:
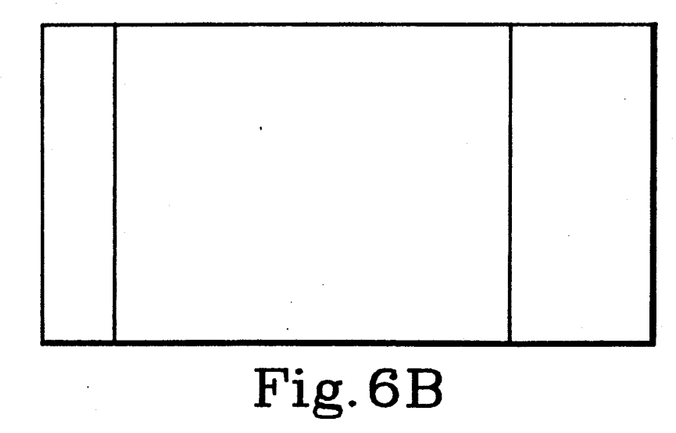
Figure 6C:
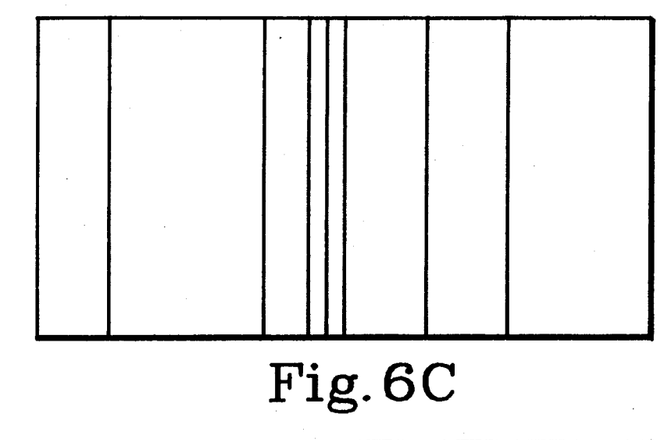
Figure 6D:
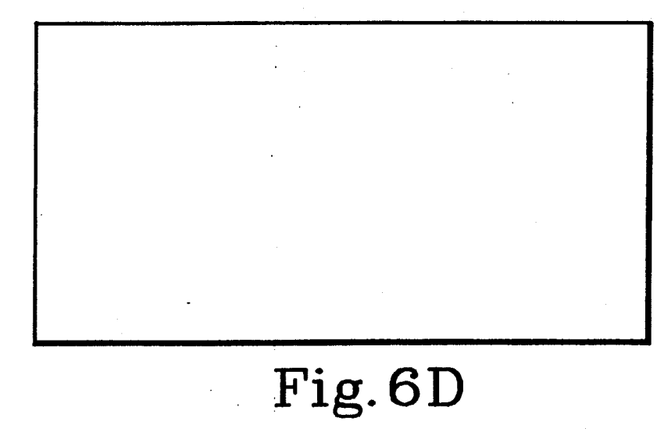

The state machine also provides a dummy pair control signal, N2D, to a first flip-flop 482 in the dummy pair logic section 48. The dummy pair control signal inserts pairs of dummy words into each line of the proposed format data stream. Alternatively the N2D signal inserts pairs of dummy words at fixed locations in each line of the pre-existing data stream at the output of the controller 40 so that when observing the output on a pre-existing monitor a pattern of spaced vertical lines representative of the particular format of the incoming video signal is formed, as shown in FIG. 6a–6d. The pattern of vertical lines provides a visual indication on a pre-existing format monitor of the format of the incoming signal, or of the original data from pre-existing format equipment For example for a 525 format as shown in FIG. 6a seven filler stripes formed by the dummy words are visible, with most of the stripes on the left side of the screen. For the 787/788 format only two filler stripes are visible as shown in FIG. 6b, while in FIG. 6c for the 1050 format seven filler stripes are again visible with most of the stripes on the right side of the screen. For the 1125 format, i.e., the pre-existing format, there are no filler stripes visible. The paired dummy control signal is normally high, so that the not-Q outputs of the two flip-flops 482, 484 are low. When a dummy pair is to be inserted, the N2D signal goes low for one sample interval and the Fs1 signal clocks the first flip-flop 482 so that the not-Q output goes high while the Q output goes low. The Q output of the first flip-flop 482 is input to the second flip-flop 484 so that on the next clock pulse of Fs1, when not-Q of the first flip-flop goes low, the not-Q output of the second flip-flop 484 goes high. The not-Q outputs are hardwire OR'd to produce a dummy gate signal, 2Dum, that is two samples in duration.

The outputs, Rem, 5Dum, 2Dum, of the remainder fill logic section 42, the identifier dummy logic section 44 and the paired dummy logic section 48 are input to an OR gate 492 in the output section 49. The output of the OR gate 492 is a composite fill signal, Dum, that is input to one input, C, of a buffer 496. The C output of the buffer 496 is the dummy gate signal, DumG, for the input FIFO 30. The composite fill signal, Dum, also is input to a second OR gate 494 for combination with the blanking signal, B, to produce a composite not-read signal, NRd, i.e., there is no active data to be read from the input FIFO 30 during the blanking and dummy intervals. The NRd signal is input to another input, B, of the buffer 496, and the inverted output, not-B, produces the read gate signal, RdG, for the input FIFO 30. Finally the pre-existing clock signal, Fs1, is passed through the buffer 496 to the input FIFO 30.

Figure 3:
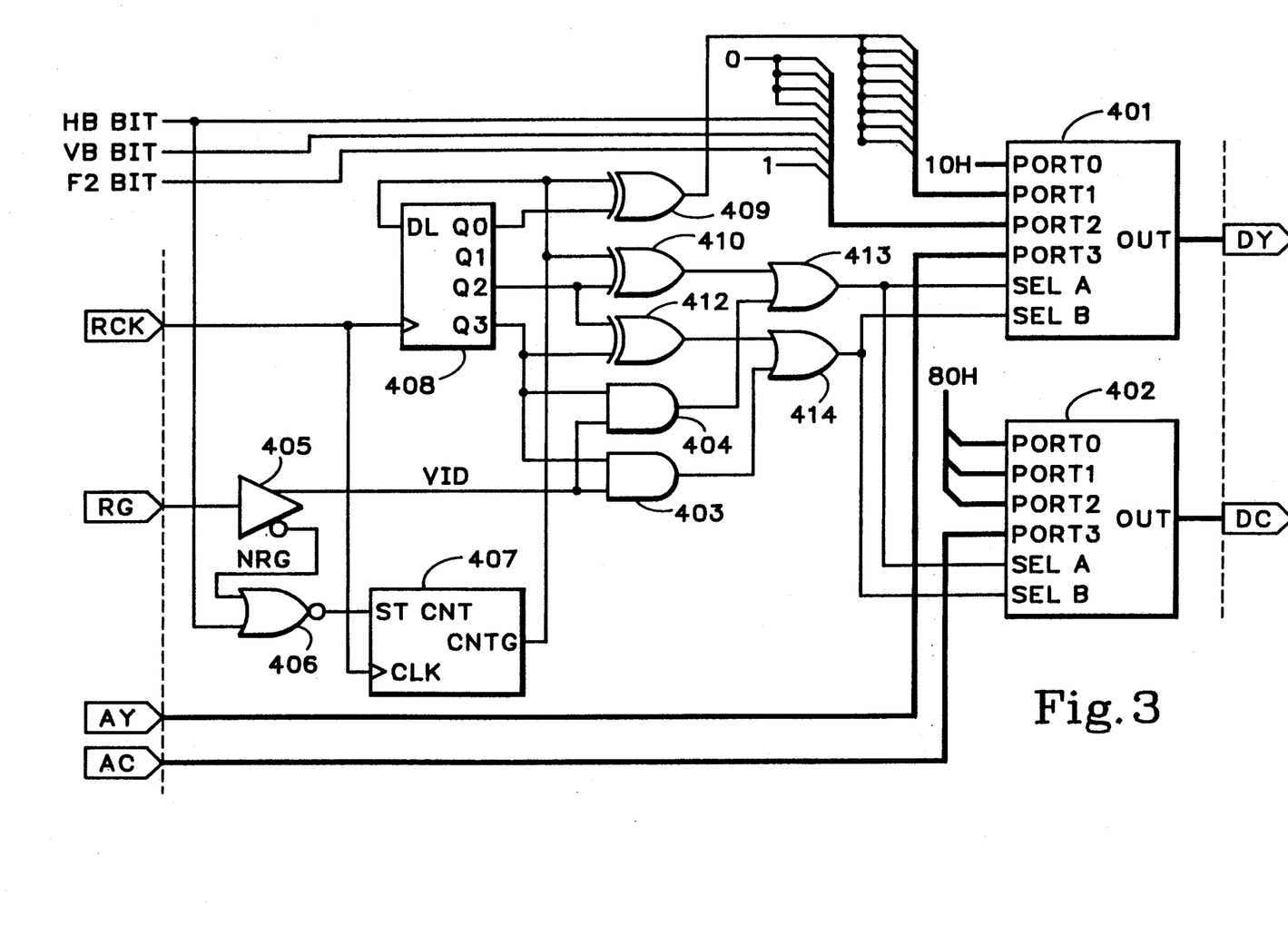
FIG. 3 is a simplified schematic diagram for outputting digital data in a pre-existing digital format.

The input FIFO 30 provides in response to the signals from the decode section of the controller 40 a data stream that includes active video samples during the read gate intervals and dummy fill samples during the dummy gate intervals. The input FIFO 30 also combines the read gate and dummy gate signals from the decoder section to form a read gate signal, RG, that encompasses the pre-existing format data line, including both active video data from the original incoming signal and inserted dummy data. The RG signal is input to the controller 40 in the input/output logic section as shown in FIG. 3 together with a read clock signal, RCk, corresponding to Fs1. The data stream, AY, AC, representing luminance and chrominance component data, is input to one input, Port3, of respective luminance and chrominance multiplexers 401, 402. When the input FIFO 30 is providing the data stream, the read gate signal RG is high providing an active video signal, Vid, to AND gates 403, 404 via buffer amplifier 405. Buffer amplifier 405 also provides a not-RG, NRG, signal to a NOR gate 406. Also input to the NOR gate 406 is a horizontal blanking bit, HBBit, from the state machine of the controller 40. The HBBit occurs during the horizontal blanking interval at the end of each line of active video for the proposed format data stream from the input FIFO 30. For a particular application where the proposed format data stream is to be recorded by the Sony DVTR, as discussed earlier, certain information is required by the DVTR, namely, an identification sequence of data words at the beginning and end of each line and a series of blanking data words between each line while the DVTR performs certain "housecleaning" functions. Therefore an end of active video (EAV) counter 407 is loaded with an internal initial count of 1924 when the output of the NOR gate 406 goes high, indicating that a read gate has started at the beginning of the active video portion of an active line. The read clock is then counted, and while the count continues a counting output is provided to the delay input DL of a digital delay line 408. The counting output also is provided as an input to a pair of exclusive-OR (XOR) gates 409, 410. The Q0 output of the digital delay line is input to the first XOR gate 409, the Q2 output is input to the second XOR gate 410 and to a third XOR gate 412, and the Q3 output is input to the third XOR gate 412 and both AND gates 403, 404. The output of the second XOR gate 410 is input to a first OR gate 413 together with the output of the second AND gate 404, and the output of the third XOR gate 412 is input to a second OR gate 414 together with the output of the first AND gate 403. The outputs of the OR gates 413, 414 are applied to the select inputs, SELA, SELB, of the multiplexers 401, 402. The output of the first XOR gate 409 is tied in common to all the input lines of Port1 of the luminance multiplexer 401. Port2 of the luminance multiplexer 401 has a value of 1xxx0000 as input, the xxx being the HBBit, VBBit and F2Bit from the state machine. Finally a black level, 10 Hex, is applied to Port0 of the luminance multiplexer 401 and a color midrange value, 80 Hex, is applied to Port0, Port1, Port2 of the chrominance multiplexer 402.

In operation when RG is positive and HBBit goes negative at the end of the horizontal blanking interval, the initial count is loaded by a start count output from the NOR gate 406. The Q outputs of the digital delay line 408 are all zero, as are the inputs to the XOR gates 409, 410, 412, and Port0 of each multiplexer 401, 402 is selected since the outputs of the OR gates 413, 414 are zero. With RG going positive the Vid signal enables the AND gates 403, 404. When the counter 407 starts counting on the next clock pulse of RCk, the outputs of XOR gates 409, 410 go positive since the inputs are at opposite levels. This places all ones on the input of Port1 of the luminance multiplexer 401 and applies a positive signal to the input of OR gate 413 to select Port1 of the multiplexers 401, 402. At the next clock pulse of RCK Q0 of the digital delay line 408 goes positive, changing the output of the first XOR gate 409 to a low level, and thus presenting all zeros to Port1 of the luminance multiplexer 401. The next clock pulse does not affect the logic, so Port1 with all zeros is still selected. At the fourth clock pulse Q2 of the digital delay line 408 goes positive, causing the output of the second XOR gate 410 to go low since it now has inputs at the same level, and causing the output of the third XOR gate 412 to go high. With the output of the third XOR gate 412 high, then the output of OR gate 414 is high, selecting Port2 of the multiplexers 401, 402. At this time the identification word 1xxx000 is applied to Port2 of the luminance multiplexer 401. On the next clock pulse Q3 of the digital delay line 408 goes high, causing the output of XOR gate 412 to go low and causing the outputs of the AND gates 403, 404 to go high. With both AND gate 403, 404 providing a high output, the OR gates 413, 414 select Port3 of the multiplexers 401, 402, passing the data stream from the input FIFO to the output. Thus the output of the luminance multiplexer 401 provides a sequence of 10 H, all "1", all "0", all "0", and ID for the first five samples after the start of the read gate RG, replacing the dummy sample values in AY provided by the input FIFO corresponding to the 5Dum portion of the DumG signal with this identification sequence.

At the end of the count, corresponding to the end of the pre-existing video line, the counting output goes low, placing different levels on the inputs of the first XOR gate 409. Since RG also goes low at that time, Vid is low and the outputs of AND gates 403, 404 go low. The same sequence is followed as described above to produce an output sequence of data words at the end of each pre-existing video line of all "1", all "0", all "0" and ID followed by a series of 10 H until the read gate RG goes high again at the beginning of the next line. The HBBit is low in the ID data word at the beginning of the line and high in the ID data word at the end of the line. The chrominance multiplexer 402 provides a series of 80 H data words during the generation of the identification sequence that is output on the luminance channel, and provides the chrominance data during the active video portion of each pre-existing format line. The active video portion is understood to include both active video of the incoming video signal and the inserted dummy data words.

Figure 4A:
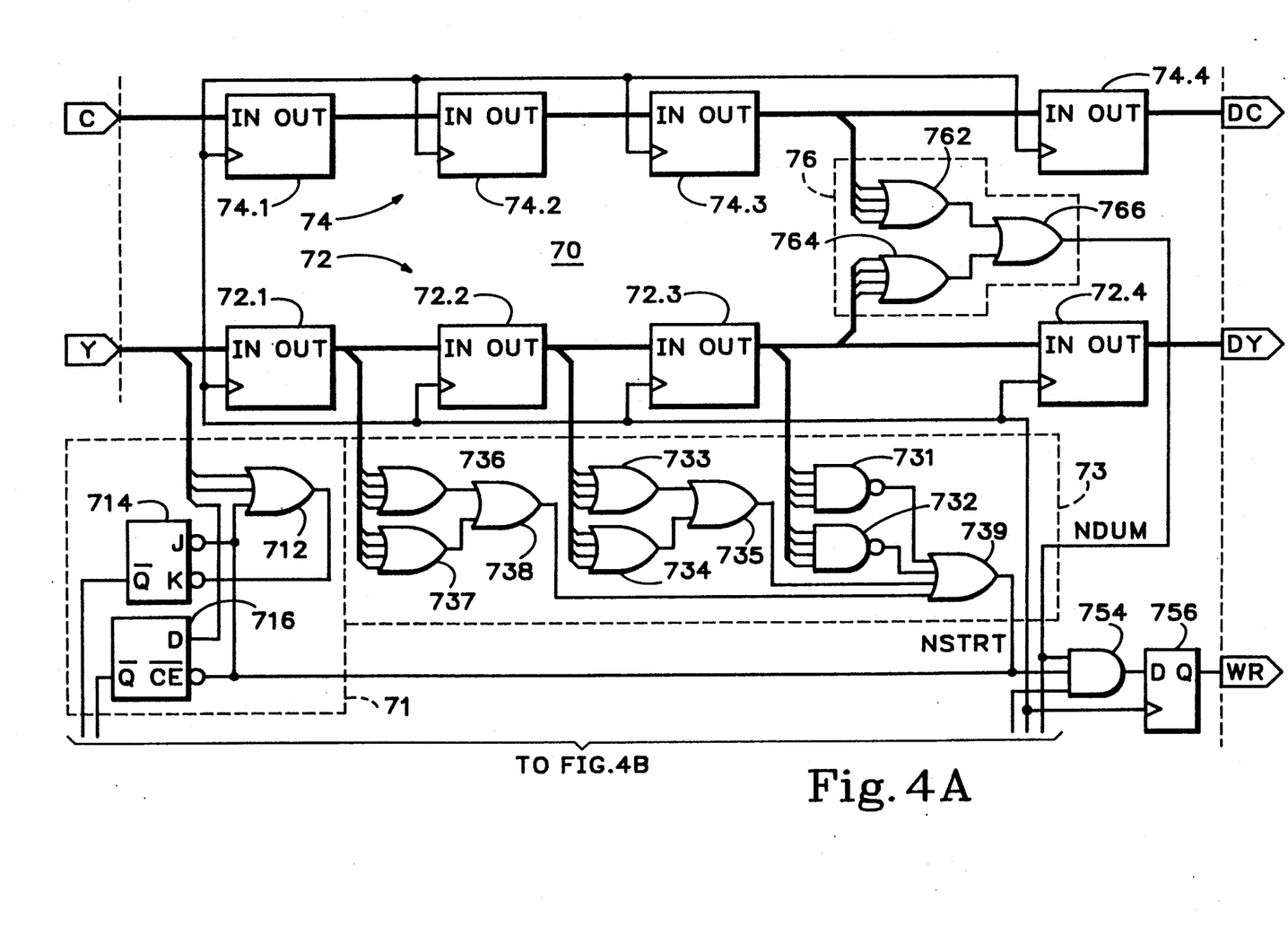
FIGS. 4A and 4B together are a simplified schematic diagram for extracting active video data from digital data in the pre-existing format and for converting it to its original signal format according to the present invention.
Figure 4B:
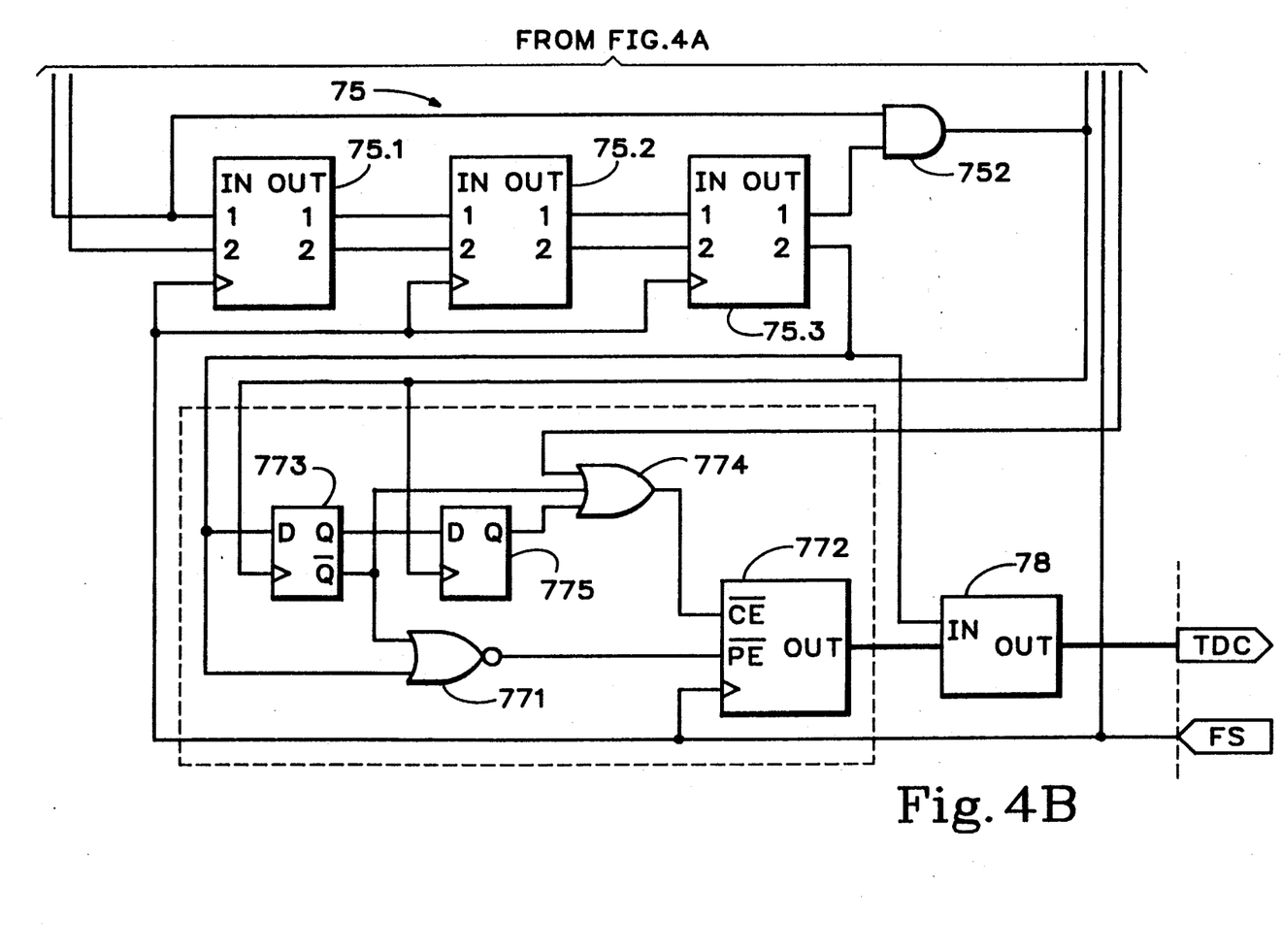

Referring now to FIGS. 4A and 4B the output portion 70 of the controller 40 is shown for reading data from the pre-existing format DVTR 10 and automatically converting it back to the original format of the corresponding incoming video signal. Luminance and chrominance data, Y, C, are input to respective pipelines 72, 74. Coupled to the pipelines 72, 74 is a dummy decoder 76. The dummy decoder 76 may either decode each data word where the values are all negative, i.e., less than 16 decimal, to determine the original format of the Y,C data stream, or as shown here merely to identify dummy samples so that they may be counted, with the count being the format identifier. In this implementation the dummy decoder 76 has three OR gates, 762, 764, 766, that provide a high output from OR gate 766 as a not-dummy signal, NDum, if any of the four most significant bits of either the chrominance or luminance component have a high value, i.e., OR gate 766 provides a high output unless both luminance and chrominance components are negative. Each pipeline 72, 74 has a series of latches 72.n, 74.n with the first latch 72.1, 74.1 having the pre-existing format data stream Y,C as inputs, and having the output coupled to the input of the next latch 72.2, 74.2 in the series, with the output of the last latch 72.4, 74.4 in the pipeline being coupled to the output FIFO 50. The data stream is clocked along the respective pipelines 72, 74 by the sample clock, Fs.

Coupled to the luminance pipeline 72 is an identification sequence detector 73 that simultaneously detects the sequence of all "1", all "0", all "0" and ID at the beginning of each line of active video. At the output of the third latch 72.3 in the pipeline 72 is an all "1" detector having a pair of NAND gates 731, 732 that produce low outputs only when all of the inputs are high. At the outputs of the first and second latches 72.1, 72.2 are respective all "0" detectors of OR gates 733–735, 736–738 that produce low outputs only when all of the inputs are low. The outputs of the all "1" and all "0" detectors are input to a detector OR gate 739 to produce a not-start signal, NStrt, that is high except when the first three words of the identification sequence appears in the data stream. Since the first three words of the identification sequence occur at both the beginning and end of each pre-existing format data line in the data stream, an identifier circuit 71 at the input of the luminance pipeline 72 looks at the ID word in the identification sequence.

The NStrt signal is input to an OR gate 712 together with the VBBit and HBBit lines (bits 4 and 5). The NStrt signal also is input to the not-J input of a J-K flip-flop 714. The output of the OR gate 712 is input to the not-K input of the flip-flop 714. The not-Q output of the flip-flop 714 is input as an active video signal, ACT, to a third pipeline 75 having latches 75.1, 75.2, 75.3 in series. The not-Q output of the flip-flop 714 goes high when NStrt goes low and the identification code indicates the start of a line, i.e., the HBBit and VBBit are both low and the output of OR gate 712 goes low. The not-Q output of flip-flop 714 goes high when NStrt goes low and the ID word indicates the end of a line, i.e., the HBBit and/or VBBit are high and the output of OR gate 712 is high. The ACT signal stays high for the entire line until the NStrt signal at the end of the line. The NStrt signal also is input to a second flip-flop 716 as a not-clock enable signal. The field identifier bit (F2Bit or bit 6) of the ID word is input to the second flip-flop 716 to provide at the not-Q output a field identification signal, NF2, that is high if the line from the data stream is in field one, and low if the line from the data stream is in field two. The NF2 signal also is input to the third pipeline 75.

The ACT signal is combined in an AND gate 752 with the output of the third pipeline to provide an ACT3 signal that is delayed by a duration equivalent to the first three words of the identification sequence. The ACT3 signal is combined with the NDum and NStrt signals in a second AND gate 754 to produce a high input to a write flip-flop 756 only when active video data, excluding dummy samples and the identification sequence, are present at the last latches 72.4, 74.4 of the luminance and chrominance pipelines 72, 74. The clock signal, Fs, clocks the active data through the last latches 72.4, 74.4 of the data stream pipelines as it clocks a write signal, WR, through the write flip-flop. The WR signal is used by the output FIFO 50 to write the active data for the original incoming signal from the data streams into the output FIFO.

The ACT3, NDum and a NF2.3 signal from the output of the third pipeline 75, together with the sample clock, Fs, are input to a dummy counter 77 to count the number of dummy samples in the first line of the first field of the pre-existing format data stream. When NF2 goes high at the first line of field one, three sample times later, as NF2.3, it is input to a NOR gate 771 to provide a clear, or not-present enable, signal for a counter 772. The NF2.3 signal also is applied to the input of a first dummy flip-flop 713 so that the ACT3 signal from the AND gate 752 clocks the NF2.3 signal into the flip-flop. The not-Q output of the flip-flop 773 goes low and is input both to the NOR gate 771 and to an OR gate 774, while the Q output is input to a second dummy flip-flop 775, the Q output of which is initially low. The Q output of the second dummy flip-flop 775 is input to the OR gate 774 together with the NDum signal. On the next ACT3 clock pulse to the flip-flop 775, the Q output goes high so that only during the first line of field one (and lines two through the end of field 2) is the Q output low. The output of the OR gate 774 is coupled to the not-count enable input of the counter 772 so that when there are dummy samples (NDum is low) in field one (not-Q from flip-flop 773 is low), line one (Q from flip-flop 775 is low), then the counter 772 counts the pulses of Fs.

The dummy count from the counter 772, together with the NF2.3 signal as the least significant bit, since there are always an even number of dummy samples, are input to an output buffer 78. The least significant bit is used by the microprocessor in the controller 40 as an interrupt signal to indicate when to read and process the dummy count from the buffer 78. When NF2.3 is low indicative of field two, then the microprocessor reads the dummy count from the buffer 78 since it is assured that the counter has completed counting the dummy samples from the first line of field one.

The microprocessor in the controller 40 then instructs the analog output module 60 to insert the appropriate sync and timing signals into the data stream from the output FIFO 50 according to the detected original format of the data in the data stream, as is well known in the art. The output of the analog output module 60 is an analog signal having the same format as the original analog signal input to the input analog module 20 prior to processing in the pre-existing digital format by the pre-existing equipment 10.

Figure 5A:
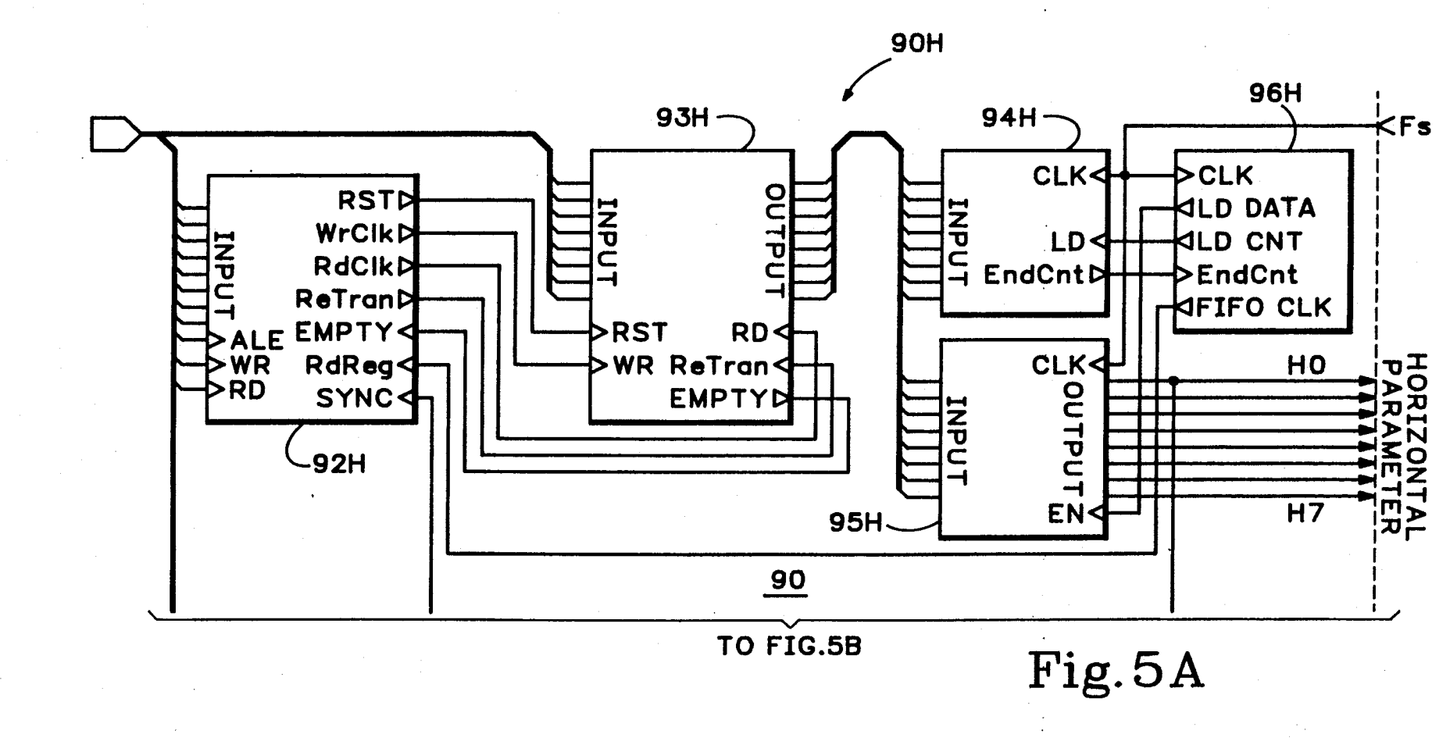
FIGS. 5A and 5B together are a block diagram of a state machine for generating control commands for the format converter accord the present invention.
Figure 5B:
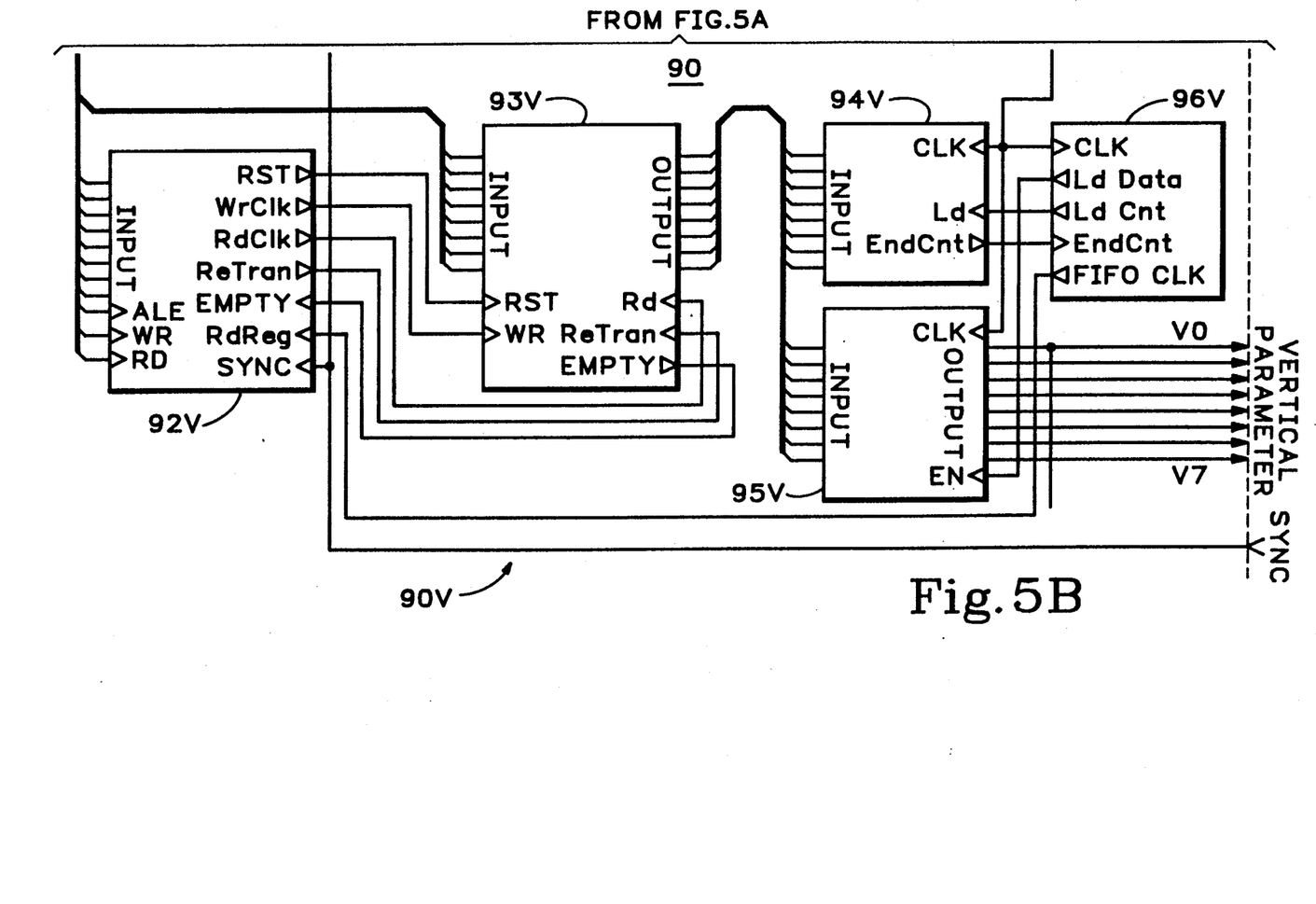

The controller 40 includes a microprocessor that communicates with a run-length encoded state machine 90 in each of the analog input and output modules 20, 60 and the input/output section of the controller over a control bus, as shown in FIGS. 5A and 5B. The state machines 90 each generate in response to data from the microprocessor the necessary parameters to convert the incoming analog signal to the pre-existing digital format, to transfer the pre-existing digital format data to and from the pre-existing format equipment, and to reconvert the pre-existing format data back to the original incoming analog signal. Each state machine 90 includes a horizontal and a vertical control section 90H, 90V, with the horizontal section having a pixel clock input, Fs, and providing a line rate clock input for the vertical section. Each section 90H, 90V has a FIFO control register 92, a FIFO buffer 93, a run length encoded counter 94 and corresponding latch 95, and a load control register 96. Data from the microprocessor control bus is input to the FIFO control register 92 and the FIFO buffer 93. Commands from the microprocessor are loaded into the FIFO control register 92 for decoding, and data from the microprocessor are loaded into the FIFO buffer 93. The commands from the microprocessor include a FIFO reset command, a write clock, a read clock, and a retransmit command. The reset command clears the FIFO buffer 93, while the write and read clocks cause data to be written into or read out of the FIFO buffer. The retransmit command causes the last data in the FIFO buffer 93 to be read out again. The FIFO buffer 93 provides an empty signal to the FIFO control register 92 when the FIFO buffer contains no data. A sync signal from the appropriate analog module 30, 50 or I/0 section of the controller 40 provides timing for the state machine 90, and is input to the FIFO control register 92.

The data read from the FIFO buffer 93 is input to the counter 94 and to the latch 95. The load control register 96, the counter 94 and the latch 95 are clocked by the pixel clock, Fs, in the horizontal section 90H and by a horizontal line rate signal, HO, from the horizontal latch 95H in the vertical section 90V. The load control register 96 enables the latch 95 to load data, causes the counter 94 to be loaded, and provides a FIFO clock as a read request signal to the FIFO control register 92. The load control register 96 receives an end count signal from the counter 94 and then enables the latch 95 to store a new data word on the next clock pulse. The count stored in the counter 94 is the number of clock periods that a particular data value is to be held, i.e., the number of clock pulses that make up the horizontal blanking interval, for example. In this manner the necessary control signals from the microprocessor are generated for both orthogonal axes of the signal being converted, as is well known to those of ordinary skill in the art.

With input and output FIFO buffers 30, 50 having a large enough capacity to encompass the vertical interval, i.e., forty-five lines or greater, then European television formats having a fifty frames per second rate, as opposed to the NTSC format having sixty frames per second (59.94), may also be processed by the format converter of the present invention.

Thus the present invention provides a format converter architecture that stores any input signal having an orthogonal structure, such as video image signals, into a pre-existing digital format by inserting into a digital data stream, representing the active samples of the input signal, dummy fill samples having a predetermined code that is not compatible with "legal" sample values for the input signal to make up a digital data stream compatible with the pre-existing digital format, and by subsequently extracting the dummy fill samples from the pre-existing compatible digital data stream and automatically determining the original structure of the signal to reproduce the input signal.

What is claimed is:

1. An apparatus for converting an input signal having a specified format into a digital signal having a pre-existing digital format, both the specified and pre-existing digital formats being orthogonal in structure and having lines and fields, comprising:
    means for extracting from the input signal an active data portion according to the specified format to generate a digital data stream of active samples; and
    means for inserting into the digital data stream dummy samples to generate the digital signal, the number of the dummy samples being a function of the relationship of the specified format and the pre-existing digital format.

2. An apparatus as recited in claim 1 wherein the inserting means comprises:
    means for temporarily storing at a first data rate the digital data stream on a first-in/first-out basis; and
    means for generating timing signals for reading the active samples from the storing means at a second data rate and for adding the dummy samples to the active samples to produce the digital signal at the second data rate.

3. An apparatus as recited in claim 2 wherein the inserting means further comprises means for inserting an identification sequence of samples at the beginning and end of each line of the digital signal in lieu of dummy samples.

4. An apparatus as recited in claim 1 further comprising:
    means for extracting the dummy samples from the digital signal to generate the digital data stream of active samples;
    means for determining from the dummy samples the specified format; and
    means for recreating the input signal from the digital data stream according to the specified format as ascertained by the determining means.

5. An apparatus as recited in claim 4 wherein the extracting means comprises:
    means for differentiating between the dummy samples and the active samples in the digital signal;
    means for generating a timing signal only when the active samples are present in the digital signal; and
    means for temporarily storing at a second data rate the digital data stream of active samples when the timing signal is present.

6. An apparatus as recited in claim 5 wherein the differentiating means comprises means for decoding each sample of the digital signal to produce a dummy signal when each dummy sample is present in the digital signal, the dummy signal being used by the generating means to produce the timing signal.

7. An apparatus as recited in claim 4 wherein the determining means comprises means for decoding each dummy sample in the digital signal to generate output parameters for the recreating means, the code of the dummy samples being indicative of the specified format.

8. An apparatus as recited in claim 4 wherein the determining means comprises means for counting the dummy samples over a specified interval to generate output parameters for the recreating means, the number of dummy samples within the specified interval being indicative of the specified format.

9. An apparatus for converting a digital signal having a pre-existing digital format automatically into an output signal of a different format, the digital signal including dummy samples, comprising:
    means for extracting the dummy samples from the digital signal to generate a digital data stream of active data samples;
    means for determining from the dummy samples the different format to produce output parameters; and
    means for creating the output signal from the digital data stream according to the output parameters.

10. An apparatus as recited in claim 9 wherein the extracting means comprises:
    means for differentiating between the dummy samples and the active samples in the digital signal;

means for generating a timing signal only when the active samples are present in the digital signal; and means for temporarily storing at a second data rate the digital data stream of active samples when the timing signal is present.

11. An apparatus as recited in claim 10 wherein the differentiating means comprises means for decoding each sample of the digital signal to produce a dummy signal when each dummy sample is present in the digital signal, the dummy signal being used by the generating means to produce the timing signal.

12. An apparatus as recited in claim 9 wherein the determining means comprises means for decoding each dummy sample in the digital signal to generate the output parameters for the creating means, the code of the dummy samples being indicative of the different format.

13. An apparatus as recited in claim 9 wherein the determining means comprises means for counting the dummy samples over a specified interval to generate the output parameters for the creating means, the number of dummy samples within the specified interval being indicative of the different format.

14. An apparatus as recited in claim 9 further comprising:

means for converting an input signal having the different format into the digital data stream of active samples according to the different format; and means for inserting the dummy samples into the digital data stream to generate the digital signal, the number of the dummy samples being determined by the relationship of the different format with the pre-existing digital format.

15. An apparatus as recited in claim 14 wherein the inserting means comprises:

means for temporarily storing at a first data rate the digital data stream on a first-in/first-out basis; and means for generating timing signals for reading the active samples from the storing means at a second data rate and for adding the dummy samples to the active samples to produce the digital signal at the second data rate.

16. An apparatus as recited in claim 15 wherein the inserting means further comprises means for inserting an identification sequence of samples at the beginning and end of each line of the digital signal in lieu of dummy samples.

* * * * *